G. H. STORM.
SUPPLEMENTAL SEAT FOR MOTOR CARS.
APPLICATION FILED FEB. 14, 1911.
1,005,080.
Patented Oct. 3, 1911.
2 SHEETS—SHEET 1.
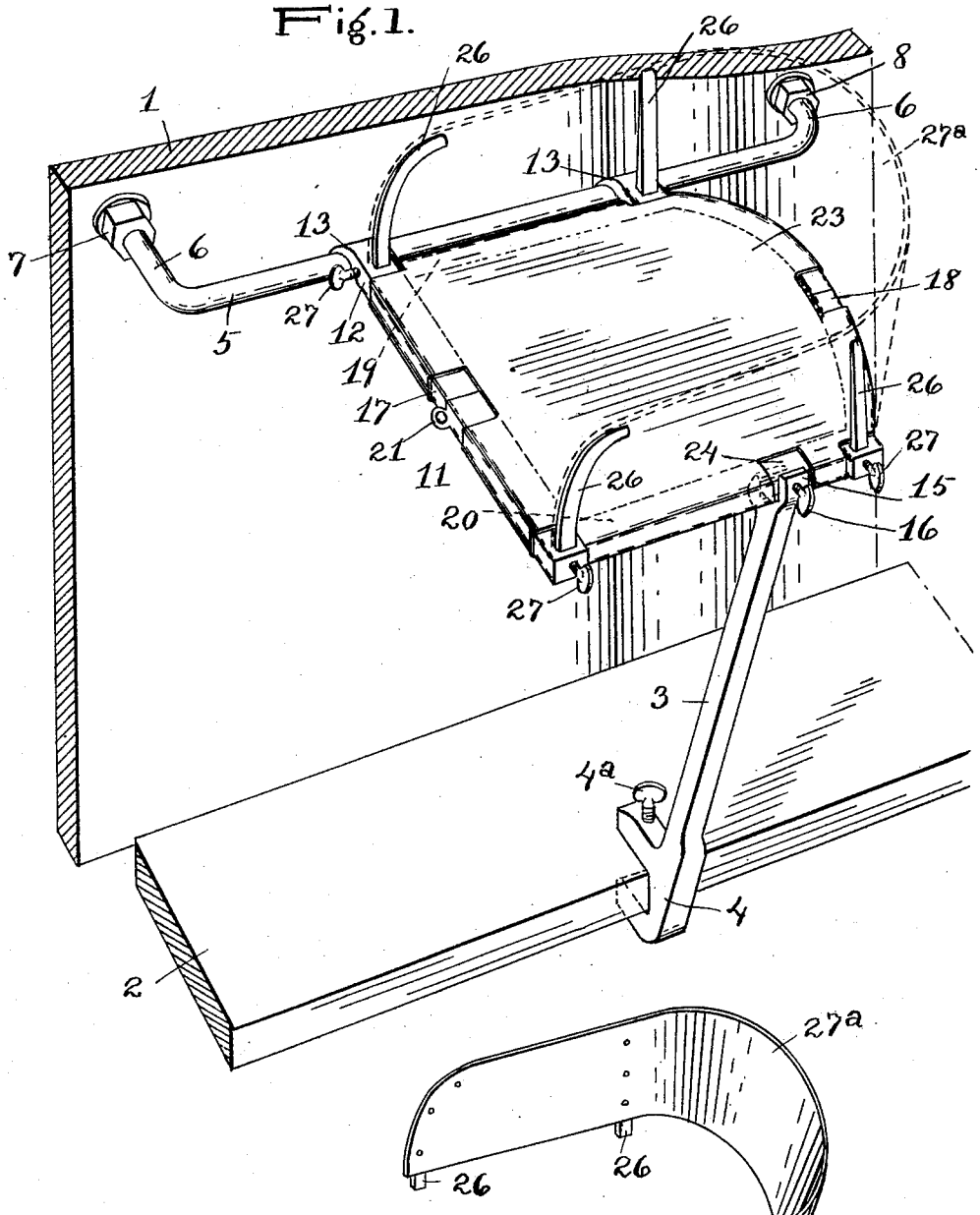
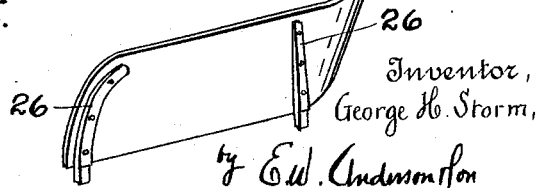

G. H. STORM.
SUPPLEMENTAL SEAT FOR MOTOR CARS.
APPLICATION FILED FEB. 14, 1911.
1,005,080.
Patented Oct. 3, 1911.
2 SHEETS—SHEET 2.
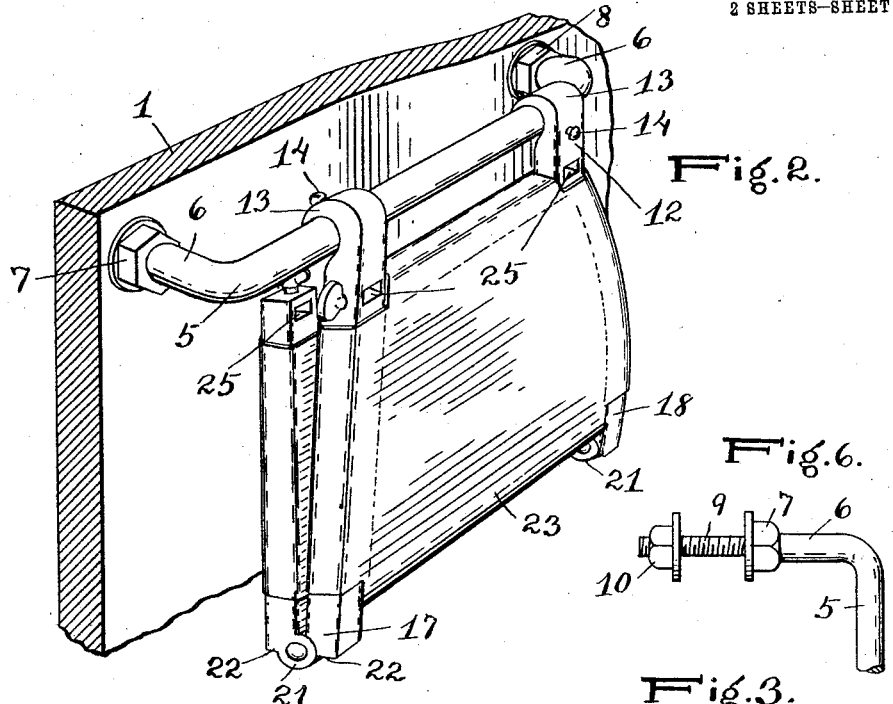
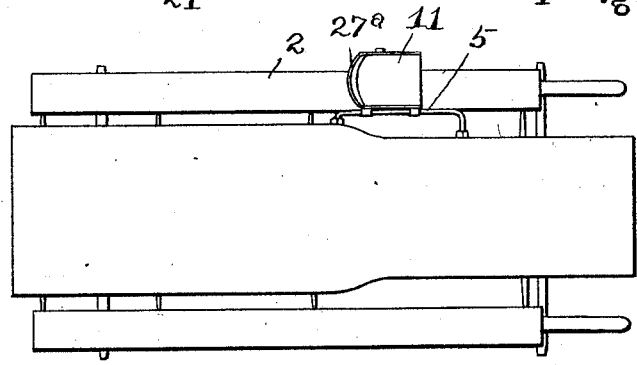
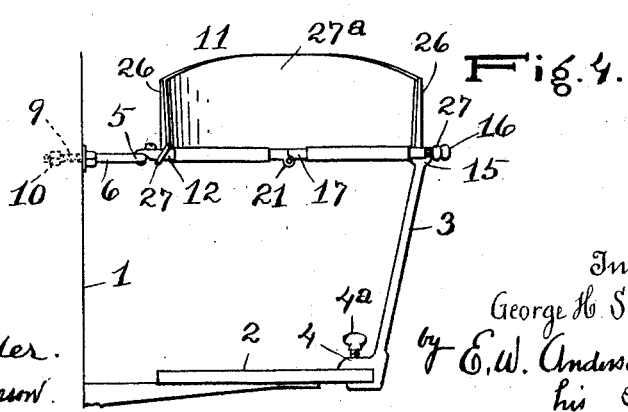
Witnesses
Stuart Hilder.
Frances W. Anderson.
Inventor,
George H. Storm,
by E. W. Anderson
his Attorneys

UNITED STATES PATENT OFFICE.

GEORGE H. STORM, OF NEW YORK, N. Y., ASSIGNOR, BY DIRECT AND MESNE ASSIGNMENTS, OF ONE-HALF TO PHILIP WILLOUGHBY MASI AND ONE-HALF TO CORA SINCLAIR, BOTH OF NEW YORK, N. Y.

SUPPLEMENTAL SEAT FOR MOTOR-CARS.

1,005,080. Specification of Letters Patent. Patented Oct. 3, 1911.

Application filed February 14, 1911. Serial No. 608,552.

*To all whom it may concern:*

Be it known that I, GEORGE H. STORM, a citizen of the United States, resident of New York, in the county of New York and State of New York, have made a certain new and useful Invention in Supplemental Seats for Motor-Cars; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention as applied, showing the back rest in dotted lines. Fig. 2 is a similar view with the back rest removed and the seat folded and swung pivotally to hang from its supporting rod. Fig. 3 is a plan view of the invention as applied. Fig. 4 is a front view of the invention as applied. Fig. 5 is a perspective detail view of the back rest, and Fig. 6 is a detail plan view of fragmentary character of one end of the horizontal supporting rod.

The invention relates to motor car seats, and has for its object to provide a supplemental seat outside the frame or chassis of the car and over the running board, for the chauffeur when the owner wishes to drive or there is no other seat available.

The invention consists in the novel construction and combinations of parts as hereinafter set forth.

In the accompanying drawings, illustrating the invention, the numeral 1 designates the frame or chassis of the car and 2 the running board.

The parts of my invention consist preferably of a standard or upright supporting rod 3 having an inward extending forked lower end 4 embracing the outer edge of the running board in a longitudinally adjustable and detachable manner and having a set-screw 4ª bearing upon the running board to secure the standard in upright position; a horizontal supporting rod 5 having inward extending or offset end portions 6, 6 extending through perforations of the chassis frame and having outer shoulders 7 and 8 and threaded ends 9 with which securing nuts 10 have engagement; and a seat 11, the frame 12 of which has inner forked ends 13, 13 embracing and resting upon the horizontal supporting rod in a longitudinally adjustable detachable manner, and having set screws 14 to fix the adjustment, said frame of the seat resting at its outer portion in a recess seat between the branches of the forked upper end 15 of the upright supporting rod, which has also a set-screw 16 to fix the parts in position.

It is desirable to make the seat of folding character as shown, with the seat frame consisting of front and rear bars 17 and 18 and connecting transverse inner and outer bars 19 and 20, said front and rear bars having each a central hinged connection 21 for the sections thereof at the lower portion of these bars, and abutting shoulders 22, 22 at the upper portions of the bars, the two halves of the seat frame thus being capable of folding upward toward each other into compact form. When the two halves of the seat are unfolded or spread the bearing shoulders will come together, when the two seat halves are in the same plane, or horizontal, and prevent further downward movement thereof.

The seat frame is preferably covered with a flexible leather covering 23, which is turned down over the frame bars and stitched or otherwise secured in place, with the exception of the corners of the frame, which are left exposed, as is also an intermediate portion 24 of the outer frame bar, for engagement with the upright supporting rod.

The exposed seat frame corners are preferably provided each with perforations or recess seats 25, of angular form in cross-section, with which vertical posts 26 have detachable engagement at their lower ends, set-screws 27 being provided to fix the parts in position. These vertical posts, of which four are shown, one for each corner, are designed to carry a rest 27ª for the lower part of the back, said rest extending around the inner and outer sides of the seat, as shown. This rest is preferably made of flexible material, such as leather, which may be detached with the corner posts aforesaid and folded.

The parts of my invention are capable of being readily assembled in position and as readily attached to the car.

When the supplemental seat is not to be used, the standard for supporting the outer side of the seat may be readily detached from the running board and from the seat, the back rest detached from the seat, and the seat folded and moved pivotally upon the horizontal supporting rod as a center and allowed to hang from said rod in folded condition, out of the way, as shown in Fig. 2 of the drawings, the flexible back rest being also folded and stored within the car. The horizontal supporting rod, the standard, the seat, and the back rest being all preferably detachable with relation to each other and to the car, and the seat and back rest being foldable, all of the parts may be stored in small compass for transmission from place to place.

Having thus described my invention, what I claim as new and desire to secure by Letters Patent is:

1. A supplemental seat for a motor car having a running board, comprising a horizontal bar having inturned end portions capable of connection with the car to leave an interval between said bar and said car, a seat having lengthwise-adjustable pivotal connection with said bar, and a standard having a lower inturned forked end capable of detachably embracing the edge of the running board and an upper forked end capable of detachably embracing the outer frame bar of said seat.

2. A supplemental seat for a motor car having a running board, comprising a horizontal bar capable of connection with the car, a seat having connection with said bar, a standard having rigid detachable connection with said seat and capable of rigid detachable connection with the running board, and a detachable flexible folding back for said seat.

3. A supplemental seat for a motor car having a running board, comprising a horizontal bar having inturned end portions capable of connection with the car to leave an interval between the bar and said car, a seat having connection with said bar and provided with a skeleton frame having corner recess seats, a standard having rigid detachable connection with said seat and capable of rigid detachable connection with the running board, and a detachable flexible folding back for said seat having supporting posts engaging said seats.

4. A supplemental seat for a motor car having a running board, comprising a support for connection with the car, a seat having pivotal connection with said support, said seat being composed of two longitudinally-hinged and foldable sections, and a standard for supporting the outer side of said seat and for maintaining the seat always when in use in unfolded position, said standard having rigid detachable connection with said seat and being capable of rigid detachable connection with said running board.

5. A supplemental seat for a motor car having a running board, comprising a support capable of connection with the car, a seat having pivotal connection with said support, said seat being composed of two longitudinally-hinged and foldable sections, the inner section being in folded position capable of assuming a position between the outer section and the car, and the outer and inner sections being foldable upon said support to hang downward therefrom, means for securing said seat against movement in position suspended from said support, and a standard for supporting the outer side of said seat and for maintaining the seat always when in use in unfolded position, said standard being capable of rigid detachable connection with said running board.

6. A supplemental seat for a motor car having a running board, comprising a support, a seat having pivotal connection with said support, said seat being composed of two hinged and foldable sections, and a standard for supporting the outer side of said seat and for maintaining the seat always when in use in unfolded position, said standard having a forked upper end capable of rigid detachable connection with the seat and an inturned forked lower end capable of rigid detachable connection with the running board.

In testimony whereof I affix my signature, in presence of two witnesses.

GEO. H. STORM.

Witnesses:
R. W. STORM,
FRANK D. ROYLANCE.

---

Copies of this patent may be obtained for five cents each, by addressing the "Commissioner of Patents, Washington, D. C."